UNITED STATES PATENT OFFICE.

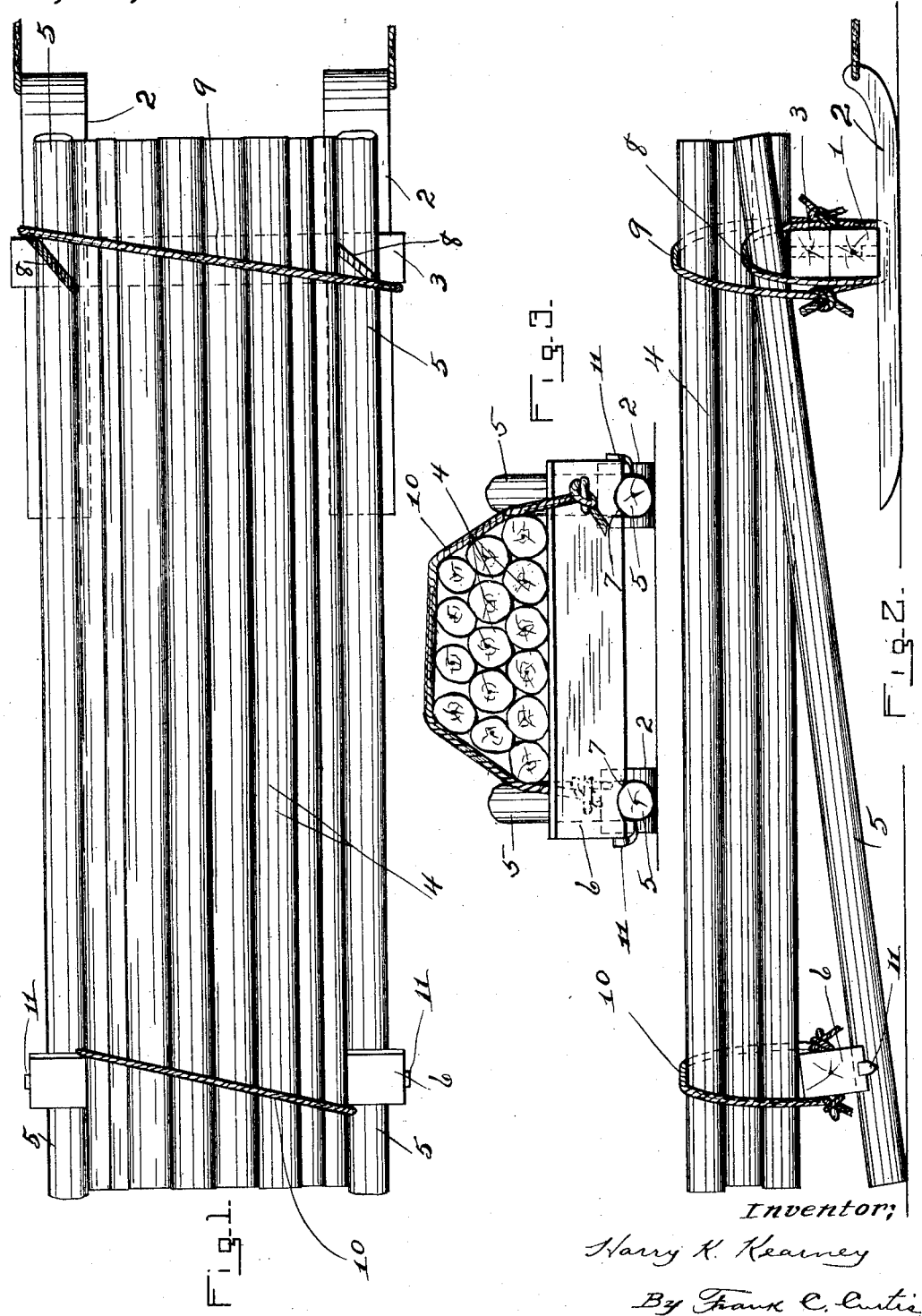

HARRY K. KEARNEY, OF LINCOLN, NEW HAMPSHIRE.

LOG-HAULING APPARATUS.

1,330,123. Specification of Letters Patent. Patented Feb. 10, 1920.

Application filed June 24, 1919. Serial No. 306,411.

*To all whom it may concern:*

Be it known that I, HARRY K. KEARNEY, a subject of Great Britain, residing at Lincoln, in the county of Grafton and State of New Hampshire, have invented new and useful Improvements in Log-Hauling Apparatus, of which the following is a specification.

Reference may be had to the accompanying drawings, and the reference characters marked thereon, which form a part of this specification. Similar characters refer to similar parts in the several figures therein.

This invention relates to devices for hauling logs in lumbering; and the principal object of the invention is to simplify the apparatus for hauling the logs from the place where the timber is felled to the neighboring stream or other destination.

Other objects will appear in connection with the following description.

Figure 1 of the drawings is a top plan view of my improved log-hauling apparatus with a load of logs thereupon.

Fig. 2 is a view in side elevation of the same.

Fig. 3 is a view in rear elevation of the same.

Referring to the drawings wherein the invention is shown in preferred form, 1, 2 is a truck which may be of any known form and propelled in any known manner. I have shown a truck having runners, 2.

A front bunk, 3, is swiveled upon the truck and is adapted to support the front ends of a load of logs, 4.

A pair of skids, 5, have their front ends supported upon the front bunk, 3, in spaced-apart relation adapted to receive therebetween the front ends of the load of logs which serve to hold the front ends of the skids in said spaced-apart relation. The rear ends of the skids are adapted to trail.

A rear bunk, 6, is supported by the trailing ends of the skids, said rear bunk being notched at 7 to receive and hold in spaced-apart relation, the rear ends of the skids. The rear ends of the load of logs are supported by the rear bunk, 6.

The front ends of the skids are secured to the truck by means of a chain or rope, 8, encircling each skid and also encircling both the front bunk and a cross-beam of the truck.

The front ends of the logs are secured to the truck by means of a chain or rope, 9, which encircles the front ends of the load of logs and also a cross-beam of the truck.

The chains or ropes, 8 and 9, may be detachably secured in any known manner, as by tying the ends of the ropes or employing suitable hooks when chains are used.

The rear ends of the logs, 4, are secured to the rear bunk, 6, by means of a chain or rope, 10, encircling both the logs and said bunk. This rope or chain may be detachably secured in any known manner.

In setting up the apparatus, ordinary logs may be employed for the skids, 5, and left with the other logs, 4, at the point of destination of the load, thus greatly facilitating the return trip of the apparatus.

In thus employing ordinary logs for the skids, 5, I preferably mount upon the ends of the rear bunk, 6, spurs, 11, adapted to be driven into the skid-logs to hold the same from rotative movement.

What I claim as new and desire to secure by Letters Patent is—

1. In a log-hauling apparatus and in combination, a front bunk adapted to support the front ends of a load of logs; a truck supporting said front bunk; a pair of spaced-apart skids secured to said truck with their forward ends supported by said bunk, and their rear ends trailing; a rear bunk supported by the trailing ends of said skids and adapted to support the rear ends of said load of logs; detachable means for tying together said truck and the forward ends of said load of logs; and detachable means for securing together the rear ends of said load of logs and said rear bunk.

2. In a log-hauling apparatus and in combination, a truck having runners; a front bunk swiveled upon said truck and adapted to support the front ends of a load of logs; a pair of spaced-apart skids secured to said truck with their forward ends supported by said bunk, and their rear ends trailing; a rear bunk supported by the trailing ends of said skids and adapted to support the rear ends of said load of logs; detachable means for tying together said truck and the forward ends of said load of logs; and detachable means for securing together the rear ends of said load of logs and said rear bunk.

3. In a log-hauling apparatus and in combination, a front bunk adapted to support the front ends of a load of logs; a truck supporting said front bunk; a pair of spaced-apart skids secured to said truck with their forward ends supported by said bunk, and their rear ends trailing; a rear bunk supported by the trailing ends of said skids and adapted to support the rear ends of said load of logs; detachable means for tying together said truck and the forward ends of said load of logs; and detachable means for securing together the rear ends of said load of logs and said rear bunk, said rear bunk having means for engagement with said skids.

4. In a log-hauling apparatus and in combination, a truck; a forward bunk carried by said truck adapted to support the front ends of a load of logs; a pair of skids secured to said truck with their forward ends supported by said bunk spaced-apart to receive therebetween the forward ends of said logs and with their rear ends trailing; a rear bunk adapted to support the rear ends of said logs said rear bunk being supported by, and notched to receive and hold in spaced-apart relation, the rear ends of said skids.

5. In a log-hauling apparatus and in combination, a truck having runners, a front bunk swiveled upon said truck; a pair of skids secured to said truck with their forward ends supported by said bunk spaced-apart to receive therebetween the forward ends of the logs and with their rear ends trailing; a rear bunk adapted to support the rear ends of said logs, said rear bunk being supported by, and notched to receive and hold in spaced-apart relation, the rear ends of said skids.

In testimony whereof I have hereunto set my hand this 14th day of June, 1919.

HARRY K. KEARNEY.